United States Patent
Mitchell et al.

(10) Patent No.: US 11,295,319 B2
(45) Date of Patent: Apr. 5, 2022

(54) FRAUD DETECTION SYSTEM AND METHOD

(71) Applicant: NCR Corporation, Duluth, GA (US)

(72) Inventors: Graeme Mitchell, Dundee (GB); Francesc Alier Pous, Cupar (GB); Martin Barrett, North Lanarkshire (GB); Kevan Johnston, Stirling (GB); Peter Vettraino, Newport-on-tay (GB)

(73) Assignee: NCR Corporation, Atlanta, GA (US)

( * ) Notice: Subject to any disclaimer, the term of this patent is extended or adjusted under 35 U.S.C. 154(b) by 24 days.

(21) Appl. No.: 16/883,414

(22) Filed: May 26, 2020

(65) Prior Publication Data

US 2021/0374765 A1 Dec. 2, 2021

(51) Int. Cl.
*G06Q 30/00* (2012.01)
*G01D 5/24* (2006.01)
*G08B 21/18* (2006.01)
*G06K 7/08* (2006.01)

(52) U.S. Cl.
CPC .......... *G06Q 30/0185* (2013.01); *G01D 5/24* (2013.01); *G06K 7/082* (2013.01); *G08B 21/18* (2013.01)

(58) Field of Classification Search
None
See application file for complete search history.

(56) References Cited

U.S. PATENT DOCUMENTS

| | | | |
|---|---|---|---|
| 6,028,537 A * | 2/2000 | Suman | B60K 35/00 340/988 |
| 6,390,367 B1 | 5/2002 | Doig | |
| 7,575,166 B2 | 8/2009 | McNamara | |
| 8,496,171 B2 | 7/2013 | Ross et al. | |
| 8,704,633 B2 | 4/2014 | Ross et al. | |
| 8,915,434 B2 | 12/2014 | Mitchell et al. | |
| 9,342,717 B2 | 5/2016 | Claessen | |
| 10,152,615 B2 | 12/2018 | Mitchell | |
| 10,262,326 B1 * | 4/2019 | Yaqub | G06Q 30/0185 |
| 10,628,638 B1 * | 4/2020 | Walters | G06K 7/10564 |
| 10,936,928 B2 * | 3/2021 | Scaife | G06K 7/087 |
| 2012/0280782 A1 * | 11/2012 | Ross | G07F 19/2055 340/5.3 |
| 2013/0062410 A1 * | 3/2013 | Mitchell | G06K 13/0868 235/449 |
| 2013/0161388 A1 * | 6/2013 | Mitchell | G07F 19/2055 235/436 |

(Continued)

*Primary Examiner* — Fekadeselassie Girma
(74) *Attorney, Agent, or Firm* — John S. Economou (57) ABSTRACT

A system and method is described for detecting a foreign object such as a skimmer placed adjacent to a bezel for a magnetic card reader device, as used in automatic teller machines and gas pumps. At least two sensors are mounted adjacent to the bezel. Each sensor provides a signal that varies when a skimmer is mounted adjacent to the bezel. A controller receive measurement signals from the sensors, and generates an alarm signal when the measurement signals differ from associated predetermined baseline signals by at least associated predetermined thresholds. The alarm signal indicates that a foreign object has been detected adjacent the bezel. The sensors may be capacitive, time of flight, spectral, radar, and/or inductive. The capacitive sensors may include three or more plates, forming multiple capacitive pairs, each capacitive pair effectively forming a separate sensor.

2 Claims, 5 Drawing Sheets

(56) References Cited

U.S. PATENT DOCUMENTS

| | | | |
|---|---|---|---|
| 2014/0122047 A1* | 5/2014 | Saldivar | E21B 44/00 |
| | | | 703/10 |
| 2014/0217169 A1* | 8/2014 | Lewis | G06K 7/084 |
| | | | 235/379 |
| 2015/0083808 A1* | 3/2015 | Parashar | G01N 27/22 |
| | | | 235/449 |
| 2016/0070939 A1* | 3/2016 | Bytheway | G06F 21/86 |
| | | | 235/438 |
| 2016/0203698 A1* | 7/2016 | Steinbok | G08B 21/18 |
| | | | 340/521 |
| 2018/0331414 A1* | 11/2018 | Tunnell | H01Q 21/061 |
| 2019/0266595 A1* | 8/2019 | Zand | G06K 7/087 |
| 2020/0104666 A1* | 4/2020 | Zand | G06K 19/0723 |
| 2020/0360193 A1* | 11/2020 | Lee | G08B 21/20 |
| 2021/0061301 A1* | 3/2021 | Denthumdas | B60Q 3/16 |
| 2021/0103919 A1* | 4/2021 | Mullen | G06Q 20/387 |
| 2021/0111580 A1* | 4/2021 | Barkan | H02J 50/005 |

* cited by examiner

FIG. 8

FRAUD DETECTION SYSTEM AND METHOD

FIELD

This disclosure relates generally to an improved fraud detection system and method for use with equipment, such as automatic teller machines and gas pumps, that read information from a magnetic stripe card.

BACKGROUND

Unauthorized reading of card data, such as data encoded on a magnetic stripe of a customer' debit or credit card, while the card is being used ("card skimming"), is a known type of fraud. Card skimming is most often done by adding a skimmer, i.e., an assembly including a separate magnetic read head, to the front fascia of an automated teller machine (ATM) or gas pump which reads the magnetic stripe on the customer's card as the card is inserted or removed from the ATM or gas pump.

Current systems and methods for detecting skimmers are based on the use of a single capacitive sensor. As card skimming technology has become more sophisticated, the detection threshold of the single capacitive sensor-based system has been changed in a way which could result in more false alerts. In addition, single capacitive sensor-based systems may also be prone to cancellation effects resulting in the failure to detect a skimmer mounted on an ATM or gas pump.

Accordingly, there is a need for a fraud detection system and method which addresses the drawbacks identified above.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

As known in the art, automated teller machines (ATMs) typically include a graphic user interface for displaying information, a keypad for receiving user inputs, a bezel which has a card slot for accepting and guiding a user's credit/debit card into a card reader mechanism, a slot for dispensing a printed receipt, a cash dispensing slot for withdrawing money, and a cash deposit slot for depositing money. A controller is programmed to control the operation of the ATM and to manage external communications with a remote host. ATMs of this nature are well known and will not be described in detail herein. A gas pump which accepts credit/debit cards includes similar elements, except for the cash dispensing and deposit slots. Skimmers are typically mounted by thieves on or over the bezel of the ATM, gas pump, or other type of magnetic card reader device and are designed in a way to match or hide the original bezel so that a user does not realize that the skimmer is in place on the ATM or gas pump before the use thereof.

Figure 1:
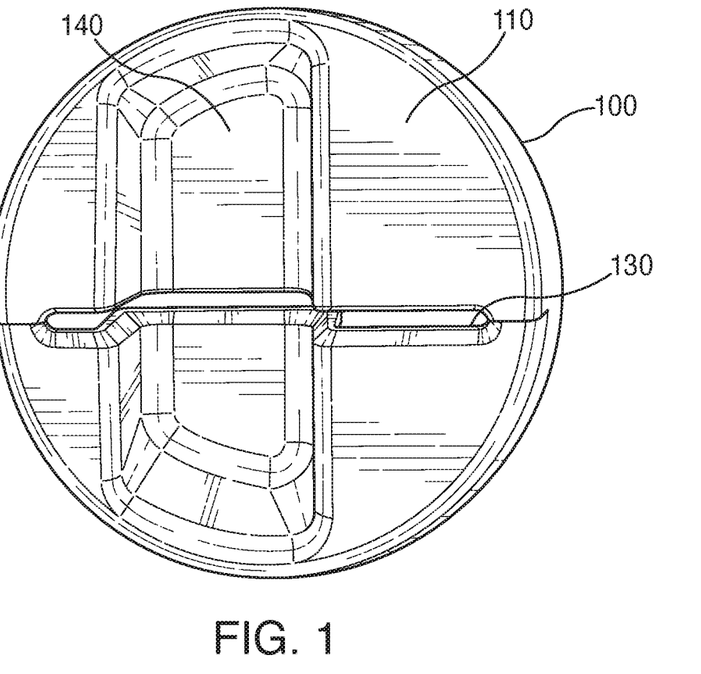
FIG. 1 is a front view of an automatic teller machine card reader bezel.

Referring now to FIG. 1, a front (exterior) portion 110 of an example bezel 100 is shown. Bezel 100 is typically a separate part, e.g., a molded plastic part, that covers the magnetic card reader device. Bezel 100 includes a slot 130 for inserting a magnetic stripe card and a cavity 140 which provides space for use in inserting and withdrawing the magnetic stripe card. The bezel 100 shown in FIG. 1 is an example of a bezel to cover a magnetic card reader device used on, e.g., an ATM or gas pump, but the particular shape or configuration of a bezel is arbitrary (i.e., dependent on the particular implementation) and thus not material with respect to the operation of the systems and method of the present disclosure. The systems and method of the present disclosure are applicable to any type of machine or equipment having an integral magnetic card reader device for reading a magnetic stripe card such as a credit or debit card via a slot (or other cavity for receiving a magnetic stripe card) in order to detect the placement of a skimmer placed over or near the card slot thereof.

Figure 2A:
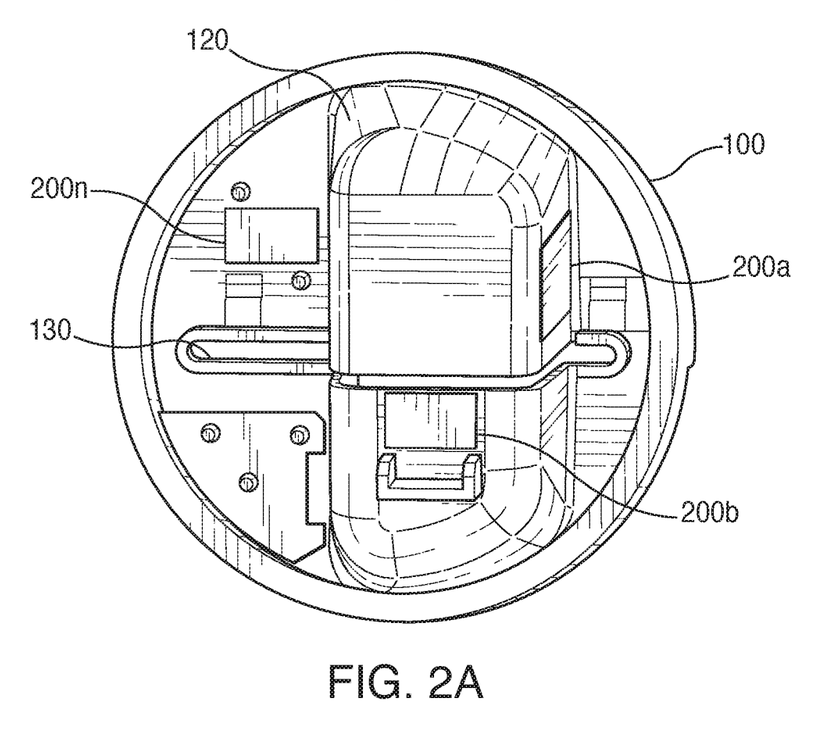
FIG. 2A is a rear view of an automatic teller machine card reader bezel showing the placement of capacitive plates for use in the fraud detection system and method of the present disclosure, and a FIG. 2B is a block diagram showing the interconnection of the capacitive plates and associated controller.
Figure 2B:
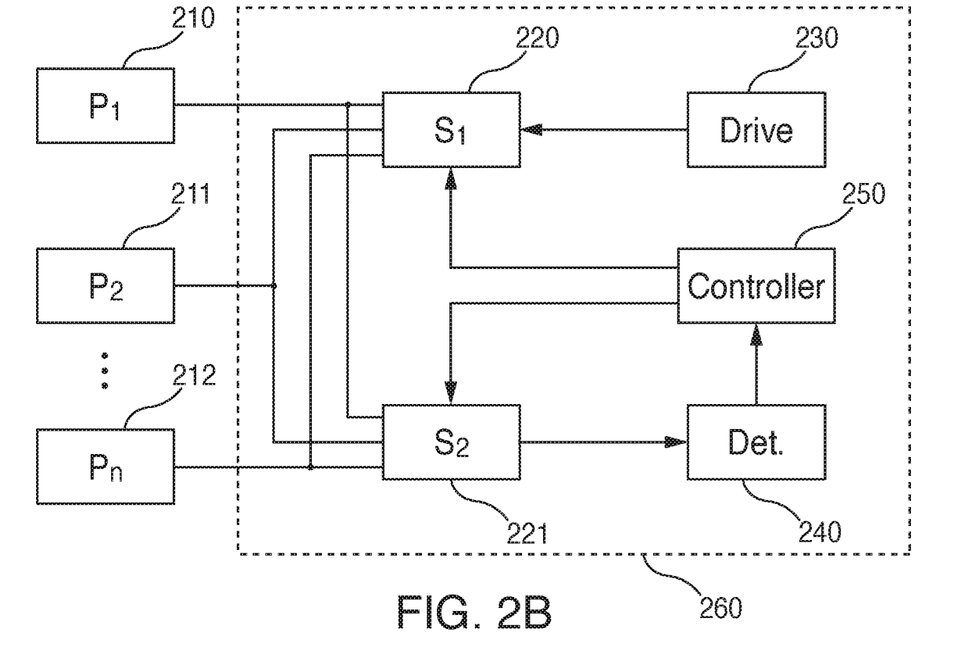

Referring now to FIG. 2A, a rear (interior) portion 120 of bezel 100 is shown including plate areas for forming capacitive sensors. In particular, in accordance with one aspect of the present invention, a series of capacitive plates 200a, 200b, . . . 200n are placed in various positions on an inner surface 210 of bezel 100, where n is a number greater than or equal to two (2). As shown in FIG. 2B, each of the capacitive plates 210, 211, 212 (corresponding to capacitive plates 200a, 200b, . . . 200n in FIG. 2B) is connected directly to a first switch (S1) 220 and to a second switch (S2), which each operate under the control of a controller 250. First switch 220 is also connected to a drive circuit 230 and is configured to selectively connect drive circuit 230 to one of the capacitive plates 210, 211, 212 based on an input from controller 250. Drive circuit 230 outputs a predetermined alternating current (AC) signal (a reference signal) to the selected one of the capacitive plates 210, 211, 212 as the transmit plate. Second switch 200 is also connected to a detection circuit 240 and is configured to selectively connect one of the capacitive plates 210, 211, 212 to the detection circuit 240 based on an input from controller 250 (the selected plate acting as the receive plate). Detection circuit 240 is configured to monitor the phase and/or magnitude of the signal received from each capacitive plate 210, 211, 212 (the reference signal) and is connected to controller 250 to provide an indication of the measured signal to controller 250. In FIG. 2B, separate components are shown for the first switch 220, the second switch 221, the drive circuit 230, the detection circuit 240, and the controller 250. As one of ordinary skill in the art will readily recognize, these circuits may all be provided as part of the functionality of a single controller (represented by the dotted line 260), integrated into a controller, or in other combinations thereof.

When controller 250 determines that the phase and/or magnitude of the received signal has changed from the predetermined value (i.e., a baseline value determined when no additional structure is placed over the front of bezel 100), it can indicate that some structure (e.g., a foreign object of some sort) has been placed over the front portion of bezel 100. This occurs because air and portions of bezel 100 fall between each plate pair and act as a dielectric (with a fixed dielectric constant), and a changed signal at the receive plate indicates a change in the dielectric. By using more than two plates which can each act as a transmit plate or a receive plate, a set of three plates provides three different capacitive sensor combinations (plate pairs), a set of four plates provides six different capacitive sensor combinations, a set of five plates provides ten different capacitive sensor combinations, etc. Rather than just a single capacitive sensor focusing on one area of the bezel (i.e., when only two plates are used), the use of multiple capacitor plates placed in and around the rear of the bezel, as shown in FIG. 2A, provides a much greater detection zone for materials placed over the front portion of the bezel 100. However, only two plates may be used when additional sensors based on one or more different technologies are also used, as discussed herein. By sequentially applying a fixed signal to each transmit plate, and measuring the signal at each associated receive plate, the signal received at each receive plate will have a predetermined magnitude and phase in normal operation. However, if additional materials are inserted between any of the plates pairs (e.g., by placing structure over the front face of the bezel 100), the dielectric constant of each plate pair will change and the magnitude and phase of the signal received at the receive plate, as measured by detection circuit 240, will also change. When this change persists or when the received signals from a number of transmit plates change, it can indicate that some structure, e.g., a skimmer, has been placed over the face of bezel 100. This provides a much greater detection area than previous solutions, and makes it much more difficult to design a skimmer structure that could avoid detection when only one or two capacitive sensors are provided.

Figure 3:
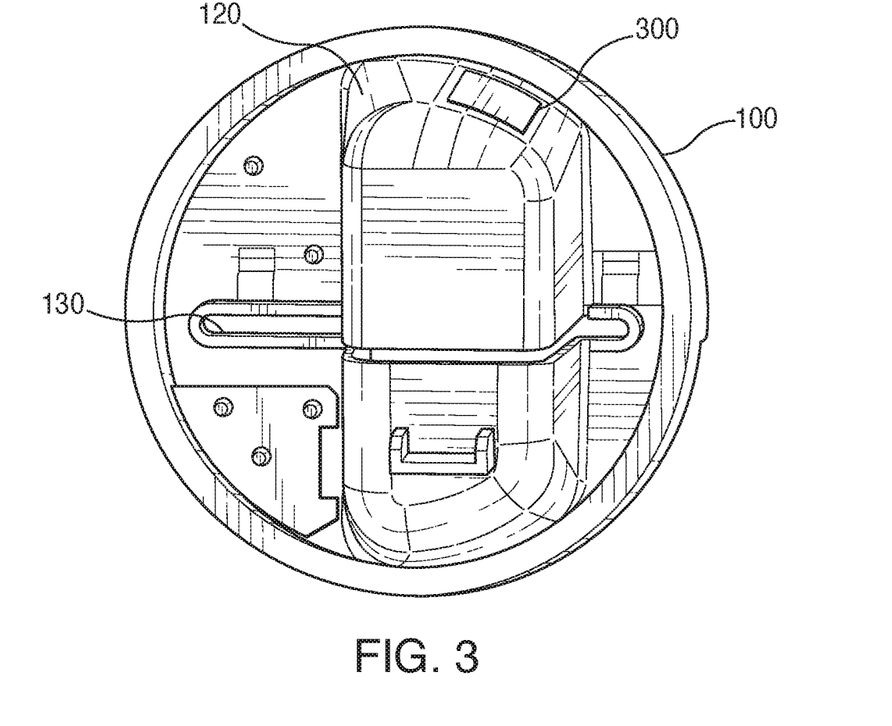
FIG. 3 is a rear view of an automatic teller machine card reader bezel showing the placement of time of a flight sensor for use in the fraud detection system and method of the present disclosure.
Figure 7:
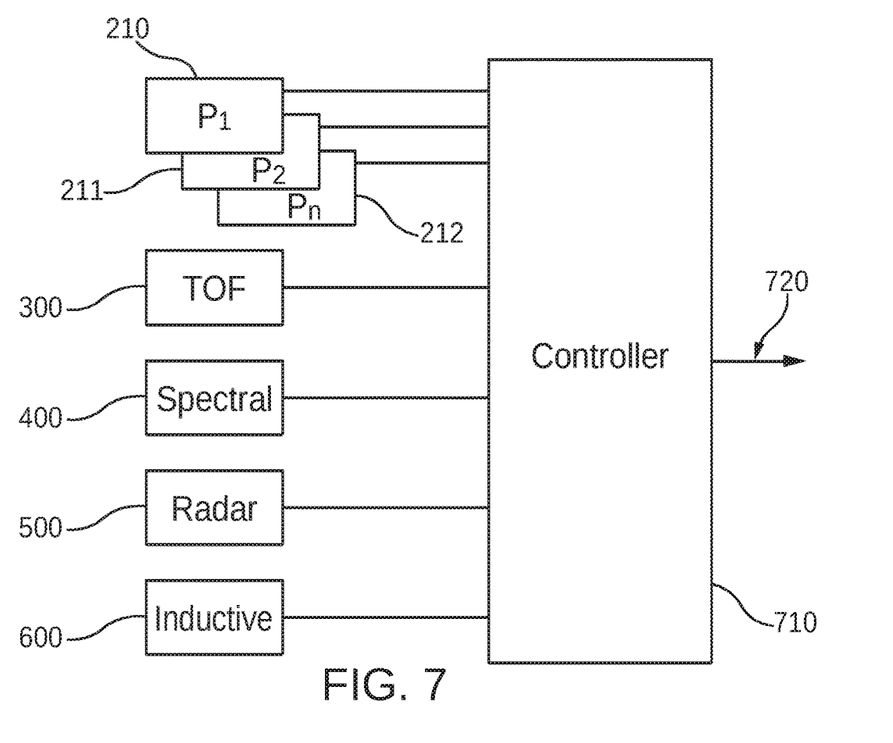
FIG. 7 is a block diagram of the fraud detection system and method of the present disclosure.

Referring now to FIG. 3, a rear portion 120 of bezel 100 is shown including a time of flight sensor 300. Time of flight sensor 300 is coupled to a controller 710, as shown in FIG. 7 below. Time of flight sensor 300 is mounted adjacent to an aperture 110 (shown in FIG. 1) and at a point where light emitted from the sensor 300 through the aperture 110 will reflect back from another part of the front of bezel 100 or a front portion of the associated ATM machine (or gas pump). For example, time of flight sensor 300 may be positioned along the top lip of the bezel 100 facing down (so that emitted light will travel downwards). A time of flight sensor measures a distance of an object in the path of its emitted light based on the time of reflection from that object. Time of flight sensor 301 provides a predetermined output (a reference output) when no structure is added to the face of bezel 100. Any change in the output from time of flight sensor 301 indicates that some structure, such as a skimmer, has been placed over the front face 101 of bezel 100 and thereby interrupted the sensor's light path. By combining the use of capacitive sensors, as shown in FIGS. 2A and 2B, with the time of flight sensor shown in FIG. 3, an additional level of confidence will be provided in determining when a skinner has been placed over the front of bezel 100. In some cases, a time of flight sensor may be used alone, e.g., when the bezel 100 is configured in a manner in which a skimmer may only be located in one place, but in most cases it is preferable to use both capacitive sensors as set forth above and one or more time of flight sensors.

Figure 4:
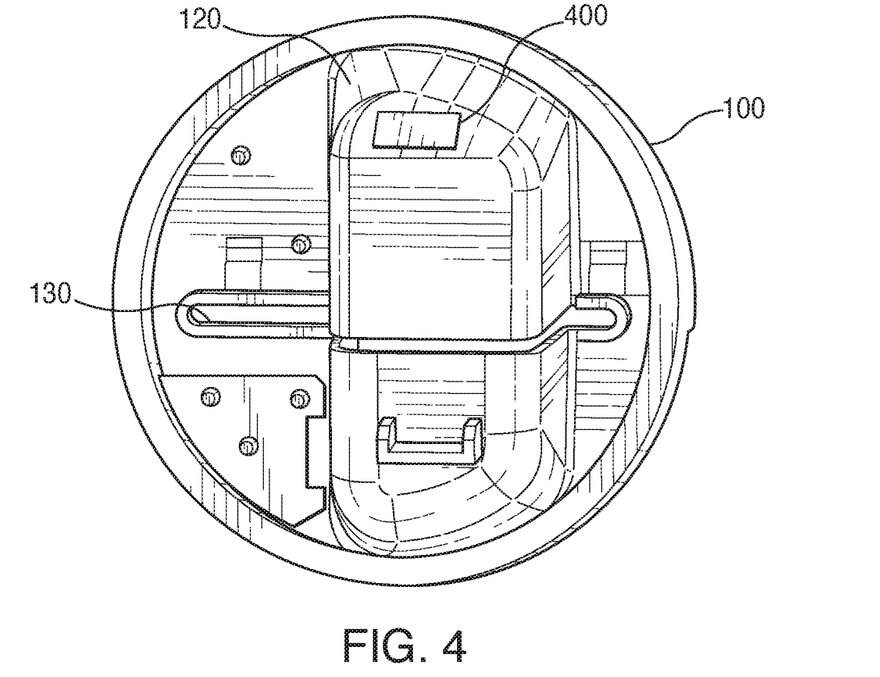
FIG. 4 is a rear view of an automatic teller machine card reader bezel showing the placement of a spectral response sensor for use in the fraud detection system and method of the present disclosure.

Referring now to FIG. 4, a rear portion 120 of bezel 100 is shown including a spectral sensor 400. A spectral sensor uses a light transmitter and receiver with various filters to measure the spectrum of reflected light, allowing multiple feedback capabilities on a single sensor. Spectral sensor 400 is coupled to controller 710, as shown in FIG. 7, and is mounted in a position where It detects, based on a change in light level, if the light at the front face of bezel 100 falls below a predetermined minimum light level, thereby indicating that the front face of bezel 100 has been covered, e.g. by a skimmer. Spectral sensor 400 may also be used as a reflective sensor, detecting a reflective pattern when the front face of bezel 100 is covered, and as a material analysis sensor, providing different responses over the reflected light spectrums, depending on the composition of the material placed over the front face of bezel. The use of a spectral sensor 400, in addition to the capacitive sensors and/or one or more time of flight sensors discussed above, provides an added level of confidence that any skimmer placed over the front face of bezel 100 will be detected without an undue number of false alarms.

Figure 5:
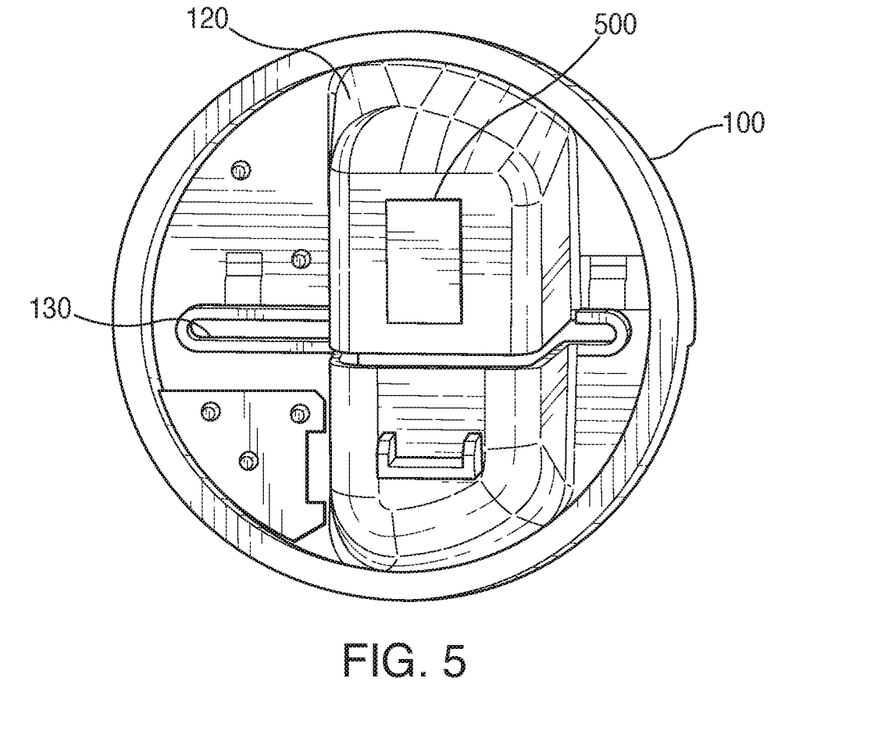
FIG. 5 is a rear view of an automatic teller machine card reader bezel showing the placement of a radar sensor for use in the fraud detection system and method of the present disclosure.

Referring now to FIG. 5, a rear portion 120 of bezel 100 is shown including a radar sensor 500 that is coupled to a controller 710 as shown in FIG. 7. Radar sensor 500 transmits and receives radio waves in a forward direction through the body of bezel 100 in order to generate a three-dimensional image of the area around outside of the bezel 100. Radar sensor 500 continually monitors bezel 100, and by incorporating image processing techniques into controller 710, a predetermined baseline image of the bezel 100 can be compared in real-time to signals from radar sensor 400 in order to detect any changes from that baseline image, thereby indicating that some structure has been added to the front of bezel 100. Radar sensor 500 provides an advantage in that no aperture is required in bezel 100 for use thereof, because the radio waves emitted by radar sensor 500 pass through the body of bezel 100. As with the spectral sensor, the addition of a radar sensor to a system using capacitive sensors, one or more time of flight sensors, and/or one or more spectral sensors provides an added level of confidence that any skimmer placed over the front face of bezel 100 will be detected without an undue number of false alarms.

Figure 6:
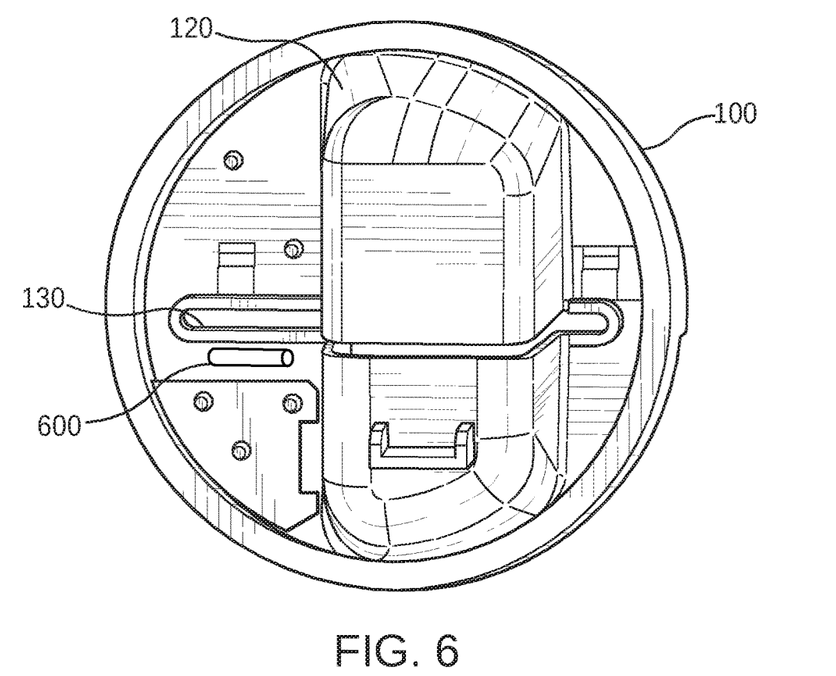
FIG. 6 is a rear view of an automatic teller machine card reader bezel showing the placement of an inductive sensor for use in the fraud detection system and method of the present disclosure.

Referring now to FIG. 6, a rear portion 120 of bezel 100 is shown including a inductive sensor 600 that is coupled to a controller 710 as shown in FIG. 7. Inductive sensor 600 acts as a proximity sensor, detecting metallic objects placed within the magnetic field. This is particularly useful in detecting the metallic portions of skimmers, e.g., read-heads, placed over bezel 100. Although only one inductive sensor 600 is shown in FIG. 6, more than one sensor may be employed, each sensor positioned on the rear of bezel 100 in areas close to where a read-head of a skimmer could be positioned, e.g., in and around the slot area 130 of the bezel 100. As with the radar sensor 500, inductive sensor 600 does not require an aperture in bezel 100 to operate. The addition of an inductive sensor to a system using capacitive sensors, one or more time of flight sensors, one or more spectral sensors, and/or one or more radar sensors provides an added level of confidence that any skimmer placed over the front face of bezel 100 will be detected without an undue number of false alarms.

Referring now to FIG. 7, a block diagram shows the interconnection of the various sensors with a controller 710. Controller 710 is shown as a single element in FIG. 7, but may also consist of a number of separate components that operate together to provide the required functionality. In particular, at least three capacitive plates 210, 211, 212 are each separately connected to controller 710. Controller 710 is configured in the manner shown in FIG. 2B discussed above to allow one of the capacitive plates 210, 211, 212 to be selectively set as a transmit plate and the other to be set as a receive plate. Controller 710 is configure to step through each possible combination of plates and compare the phase and/or magnitude of each receive (measurement) signal (i.e., the signal found at each receive plate) with a stored baseline value. When a receive signal differs from the stored (predetermined) baseline signal by at least a predetermined amount (i.e., a predetermined threshold), it is an indication that some additional structure (e.g., a skimmer) has been placed on the front of bezel 100. In addition, one or more of a time of flight sensor 300, a spectral sensor 400, a radar sensor 500, and an inductive sensor 600 may also be coupled to controller 710. Controller 710 is configured to process the inputs received from each sensor, as discussed above, and determine whether each of the signals vary from a respective predetermined baseline level by a predetermined threshold to determine if a structure such as a skimmer has been placed over the front face of bezel 100. Controller 710 is configured to determine that structure of some sort (e.g., a skimmer) has been found pursuant to the steps shown in flowchart 800 in FIG. 8 discussed below. Once controller 710 does determine that a skimmer or other structure has been placed over the front face of bezel 100, an alarm signal is generated on output 720. This alarm signal can be routed to the main control circuitry for the associated ATM or gas pump in order to cease operations until a repair is performed. This signal may also be forwarded (via circuitry not shown) to a main control location for the associated ATM or gas pump, in order to generate a repair order for that ATM or gas pump. In some cases, the alarm signal may be provided to an electronically controlled shutter mounted over the card slot which closes upon receipt of the alarm, preventing any insertion of a magnetic stripe card into the card slot. In other cases, a message may be displayed on a display of the ATM or gas pump which states that the ATM or gas pump is out of order and no card should be inserted into the card slot.

Figure 8:
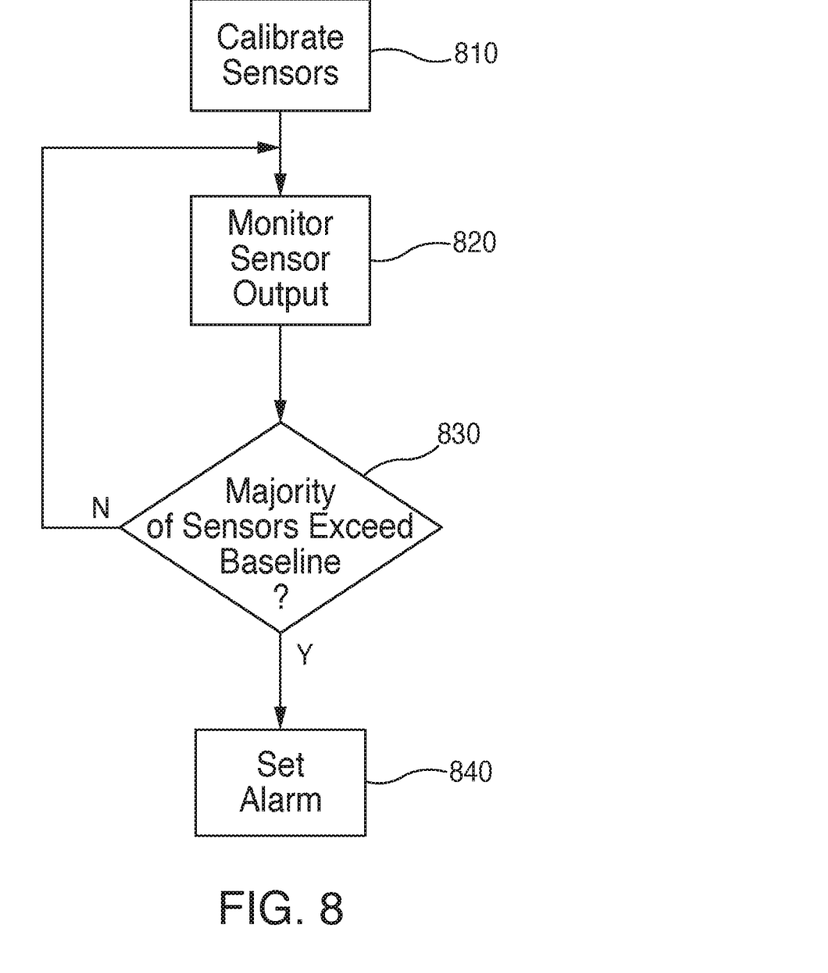
FIG. 8 is a flow chart showing the operation of the fraud detection system and method of the present disclosure.

Referring now to FIG. 8, a flowchart 800 is shown demonstrating the operation of controller 710. First, at step 810, the complete system is calibrated, e.g., at assembly or installation of the associated ATM or gas pump, to determine a baseline level for each sensor in a state when it is known that there no extra structure is mounted over an external face of the bezel. As discussed above, for each capacitive plate pair, the baseline level may be the amplitude or phase of the signal at the receive plate. For a time of flight sensor, the baseline level is a signal indicating a distance from the sensor to the nearest structure (as seen through the associated aperture in bezel 100). For a spectral sensor, the baseline level is, for example, signal indicating a level of light at the sensor. For a radar sensor, the baseline level is an image of the front part of bezel 100. For the inductive sensor, the baseline level is a signal indicating the level of nearby metallic structures. Once the ATM or gas pump is put into service, processor 710 continually receives or determines each sensor output (step 830) and compares the output of each sensor to the predetermined baseline level. When no excessive variation from the associated baseline level is found in any of the sensor outputs, processing reverts to step 820. When a variation from a baseline level beyond a preset threshold for each sensor is found in a majority of the sensor outputs, processor 710 then sets an alarm signal (e.g., on line 720) as discussed above indicating that some structure has been placed over the face of bezel 100. In this manner, the system requires at least two different sensors that are preferably based on different technologies (e.g., at least two picked from the set of capacitive, time of flight, spectral, radar, and inductive) to vary from an associated baseline level beyond a predetermined threshold in order to generate an alarm. The alarm signal is preferably generated based on a majority vote scheme. The majority vote scheme provides an added confidence that no false alarms will be generated because the preset threshold for each sensor can be set at a higher level than would be used if only that particular sensor were in use. In addition, the preset threshold for each sensor can be adjusted by predetermined weighting factors. In an alternative embodiment, the alarm signal may be generated based on a predetermined detection algorithm. The predetermined thresholds for each sensor are preferably set at configuration along with the associated baseline levels. In a further embodiment, processor 710 may also be programmed to use machine learning to vary each sensor's threshold value based on conditions at the installation location, for example, environmental variations due to lighting levels, etc.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A system for detecting a foreign object, comprising:
    a first sensor mounted adjacent to a bezel for a magnetic card reader device, the first sensor providing a first signal that varies when a foreign object is placed adjacent to an exterior portion of the bezel;
    a second sensor mounted adjacent to the bezel, the second sensor providing a second signal that varies when a foreign object is placed adjacent to the exterior portion of the bezel, the second sensor operating according to a different technology than the first sensor; and
    a controller coupled to the first sensor and the second sensor, the controller configured to receive the first signal and the second signal and to generate an alarm signal when the first signal differs from a first predetermined baseline signal by at least a first predetermined threshold and the second signal differs from a second predetermined baseline signal by at least a second predetermined threshold, the alarm signal indicating that a foreign object has been detected;
    wherein the first sensor is capacitive-based and includes at least three plates mounted adjacent to the bezel, each of the three plates coupled to the controller, the at least three plates forming capacitive pairs with each pair comprising two of the at least three plates, and wherein the controller is configured to sequentially apply a reference signal to a selected one of the two plates in each capacitive pair and to receive a measurement signal from the other of the two plates in each capacitive pair, and wherein the measurement signal from each capacitive pair corresponds to the first signal.

2. The system of claim 1, wherein the second sensor is one of a time of flight sensor, a spectral sensor, a radar sensor, and an inductive sensor.

* * * * *